United States Patent [19]

Arakawa et al.

[11] Patent Number: 4,667,230

[45] Date of Patent: May 19, 1987

[54] ENDOSCOPE HAVING A CONTROL SECTION WITH LEVEL ADJUSTING DEVICE

[75] Inventors: Satoshi Arakawa; Makoto Toyota; Fumitaka Takeshita, all of Oomiya, Japan

[73] Assignee: Fuji Photo Optical Co., Ltd., Japan

[21] Appl. No.: 730,798

[22] Filed: May 6, 1985

[30] Foreign Application Priority Data

May 18, 1984 [JP] Japan .................................. 59-100288

[51] Int. Cl.⁴ .......................... H04N 7/18; A61B 1/04; A61B 1/06
[52] U.S. Cl. .......................................... 358/98; 128/4; 128/6
[58] Field of Search .......................... 358/98; 128/4, 6

[56] References Cited

U.S. PATENT DOCUMENTS 4,519,391 5/1985 Murakoshi .............................. 128/4
4,539,586 9/1985 Damra et al. .......................... 358/98

Primary Examiner—Howard W. Britton
Assistant Examiner—John K. Pens
Attorney, Agent, or Firm—Parkhurst & Oliff

[57] ABSTRACT

An endoscope of the type having in its imaging system a solid state imaging device provided in its insertable section into a cavity of a living body for receiving an optical image and converting it into electrical signals which are processed and then transmitted to a monitor to be visualized thereon. The endoscope comprises an operating part having an insertable section into a cavity which includes therein a solid state imaging device for receiving an optical image and converting it into electrical signals, a control unit for providing driving signals for the solid state imaging device and processing the signals from the solid state imaging device to provide a video signal and a display for receiving the video signal from the control unit to be visualized as, for example, a television picture. The operating part further includes an adjusting means for modifying levels of the driving signals corresponding to the characteristics of the solid state imaging device. The provision of the adjusting means in the operating part permits a control unit to be commonly applied to endoscopes having different characteristics of solid state imaging devices.

5 Claims, 5 Drawing Figures

ENDOSCOPE HAVING A CONTROL SECTION WITH LEVEL ADJUSTING DEVICE

BACKGROUND OF THE INVENTION

1. Field of the Invention

The present invention relates to an endoscope, and more particularly relates to an endoscope of the type having in its imaging system a solid state imaging system in its viewing head which accepts visual image information of a scene contained in an object to be observed and converts it to an electrical, output data signal for presenting a picture on the screen of viewing equipment.

2. Description of the Prior Art

As well known in the art, an endoscope generally used is made up of an image transmission optical fiber bundle with its end faces being faced to an objective or image forming lens and an eyepiece, respectively. The objective is arranged to focus a visual image of the scene inside the interested object such as a living body on the end face of the image transmission optical fiber bundle. The visual image thus focused is transmitted to the opposite end face of the optical fiber bundle so as to be observed through the eyepiece. Specifically, as shown in FIG. 1, the conventional endoscope, namely a fiberoptic endoscope, comprises a control section 10, a flexible section 12 connected to the control section 10 insertable into a cavity or opening of a living body to be ovserved and a connection section 16 extending from the control section 10 to be connected to a control unit 14 including an illumination light source and various control equipment therein.

In such fiberoptic endoscope of the type having the optical fiber bundle for visual image transmission from one end to the opposite end gace thereof, the control section 10, as shown in FIG. 2, necessarily comprises a grip section 10A which allows one-hand grasping and an eyepiece section 17 including an eyepiece lens or lenses therein which is disposed on the uppermost face of the control section 10. Provided on the front face of the control section 10 are first and second manually operable buttons 18 and 20 for air and water supply control and suction control, respectively.

When using the fiberoptic endoscope mentioned above for observation, an operator is required to firmly grasp the grip 10A of the control section 10 with the middle, medicinal and little fingers 22A, 22B, 22C of his left hand and to operate the first and second buttons 18, 20 with his forefinger 22D, while looking at a magnified image through the eyepiece lens 17. To look through the eyepiece section 17, the operator is required to bring the control section 10 close to his face by raising his arm, or to bring his head close to the eyepiece section 17 by bending his body forward. Therefore, the operator is obliged to assume an unnatural posture, resulting in his arm, waist and the like becoming numb.

Recently, a video endoscope has been proposed which has in its imaging system a solid state imaging device, such as a charge coupled device (CCD) and an image sensor of metal oxide silicon (MOS) type, which is carried in a viewing head thereof adapted for insertion into a cavity. The solid state imaging device accepts visual image information of a scene contained in an object to be observed and converts it to an electrical output data signal or a video signal for presenting a picture on a screen of viewing equipment such as a television set. Because the video endoscope employing a solid state imaging device, different from the conventional fiberoptic endoscope of the type having an image tranmission optical fiber bundle in its imaging system, presents a visual image on a screen, it has the advantage of requiring no eyepiece section and of no restriction in the shape of the control section. Since control section is not restricted in its shape, an operator can easily handle the instrument in a comfortable posture while seeing the picture on the screen.

In this type of video endoscope, there is a serious problem in that the characteristics of the solid state imaging devices vary widely. The solid state imaging devices of different characteristics result in discrepancies between full color images which appear on a screen monochromatic images of different luminance levels. In order to solve the problem, it has been necessary to adjust levels of driving signals for solid state imaging devices corresponding to their characteristics, respectively. For this reason heretofore a level adjusting device has been provided in the control unit which is to adjust the level of the driving signal corresponding to the characteristics of the solid state imaging device incorporated in the video endoscope prepareted. Alternatively, it is required to provide one control unit every video endoscope for the purpose of the elimination of complicated operation. However, the provision of the level adjusting device in the control unit is incidentally accompanied by an additional operation every time changing video endoscopes, and the provision of individual control units arises the problem of a large place for putting them and a high cost of installation.

SUMMARY OF THE INVENTION

An object of the present invention is therefore to provide a video endoscope in which the level of driving signal for the solid state imaging device incorporated therein is adjusted by easy operation at its control section so as to use a common control unit for video endoscopes having different characteristics of solid state imaging devices.

To accomplish the above-mentioned object, the video endoscope system according to the present invention comprises a video endoscope having in its imaging system a solid state imaging device incorporated in the viewing head of a flexible insertion section, a control unit which provides the solid state imaging device with a driving signal and processes video signals from the solid state imaging device to produce output signals containing full color image information and a viewing equipment with a screen on which the full color picture of an object to be observed is displayed according to the output signals. The video endoscope is further provided with an adjusting means in its control section for adjusting the level of the driving signal provided from the control unit corresponding to the characteristics of the solid state imaging device incorporated therein.

The provision of the adjusting means in the control section permits a picture to be displayed without color discrepancy or changed luminance on the screen of the viewing equipment independently of differences in the characteristics between solid state imaging devices.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Description will hereunder be given of the preferred embodiment of a video endoscope system according to the present invention with reference to the accompanying drawings.

Figure 1:
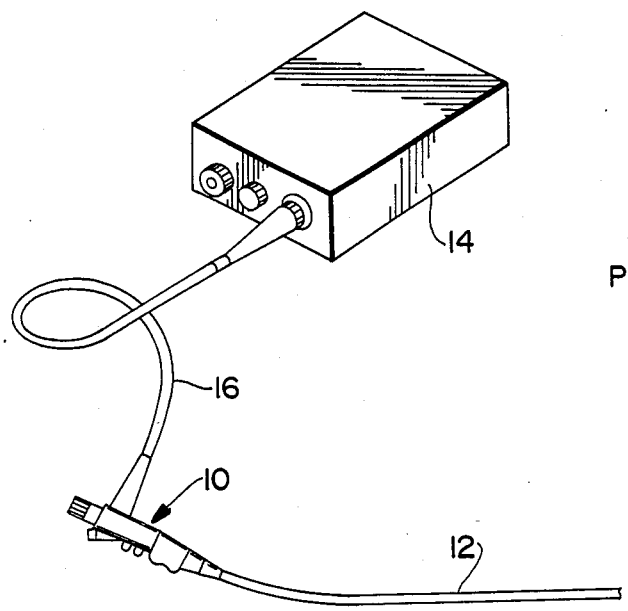
FIG. 1 is a schematic illustration of a conventional fiberoptic endoscope system.
Figure 2:
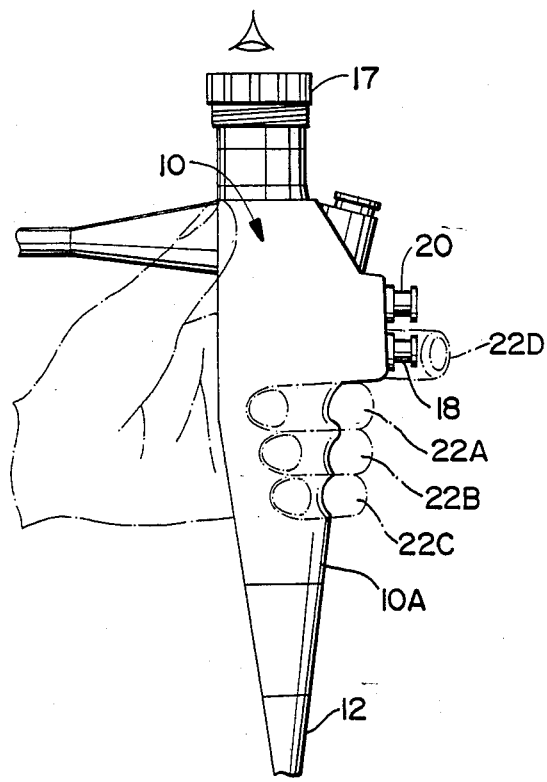
FIG. 2 is an illustration showing a control section of the fiberoptic endoscope of FIG. 1.
Figure 3:
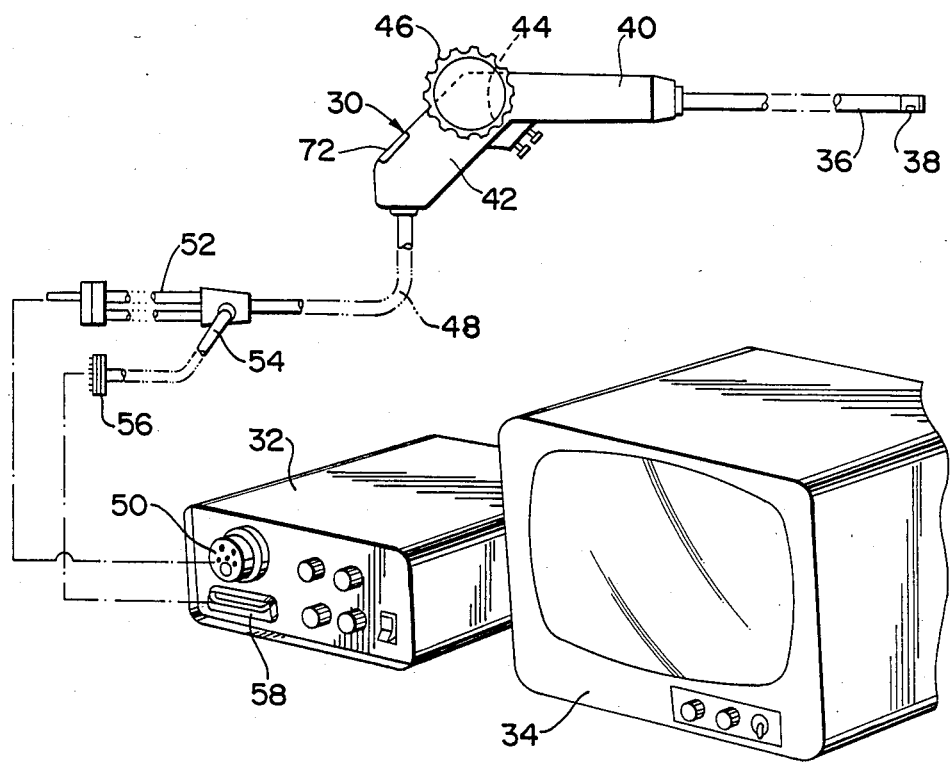
FIG. 3 is a schematic illustration showing an embodiment of the video endoscope system according to the present invention.

Refering now to FIG. 3, shown therein is a video endoscope system according to the present invention which comprises a video endoscope having a control section 30, an insertion section 36 and a connector section 48, a control unit 32 and a viewing equipment such as a monitor television receiver 34. The video endoscope is of the type having in its imaging system a solid state imaging device 38 incorporated in the viewing head of the insertion section 36 extending from the control section 30. In the control unit 32, there is housed a light source such as a lamp for emitting illumination light which enters a light transmission fiber bundle, a processor which provided a driving signal for the solid state imaging device 38 and processing a video signals from the solid state imaging device 38, a power supply e.t.c. The monitor television receiver 34 receives the video signals processed in the processor to display a full color picture on its screen.

A main portion 44 of the control section 30 comprises a coupling part 40 for coupling the insertion section 36 to the control section 30 and a grip portion 42 which is grasped by an operator. Mounted on the main portion 44 is a manually operable control knob 46, the operation of which causes the bending of the forward portion of the insertion section 36. Coupled to the bottom end of the grip 42 is a connector section 48 in which cables, a light transmission fiber bundle and the like extend. The proximal end of the connector section 48 is bifurcated with each arm being provided with a connector plug. The plug 52 through which the end portion of the light transmission fiber bundle extends is adapted to be connected to a socket 50 on the front panel of the control unit 32. On the other hand, the plug 56 which has a plurality of terminal pins of cables extending through the connector section 48, the control section 30 and the insertion 36 section to the solid state imaging device 38 and is adapted to be connected to a socket 58 also on the front panel of the control unit 32.

Figure 4:
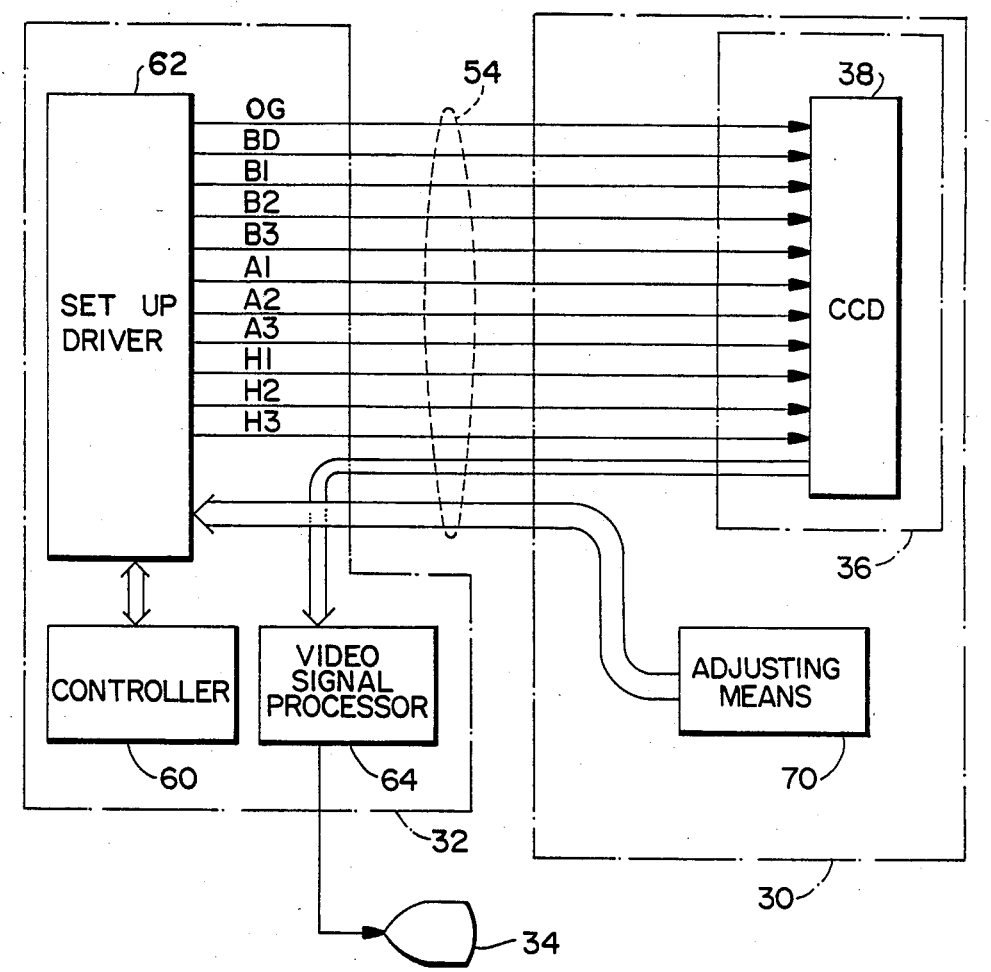
FIG. 4 is a block diagram showing the essential part of the video endoscope system of FIG. 3.

Referring to FIG. 4, shown therein in a block diagram form is an exemplary embodiment of the video endoscope of the present invention in which the control unit 32 is provided therein with a controller 60 for providing various signals such as blanking signals, synchronizing signals, and voltage for various circuits and a set up driver 62 which provides various kinds of driving signals for the solid state imaging device 38 by receiving the signals from the controller 60. In the control unit 32, there is further provided a video signal processor 64 which can process the video signal into which the solid state imaging device, that is a CCD image sensor in this embodiment, converts the visual image in formation of a scene contained in an object to be observed and provides a composite video signal for presenting a picture of the scene on the screen of the monitor television receiver 34. The driving signals from the set up driver 62 include an output gate signal (OG), a base biasing voltage (BD), vertical register clock signals A1 A3 and B1 B3 for three-phase driving image area and storage area of the CCD image sensor, respectively, horizontal register clock signals H1 H3 and the like all of which are applied to the CCD image sensor 38. Turning to the video endoscope, the main portion 44 of the control section 30 has therein the adjusting means 70 which is operated to effect the set up driver 62 to modify the level of set up driver output signal.

Figure 5:
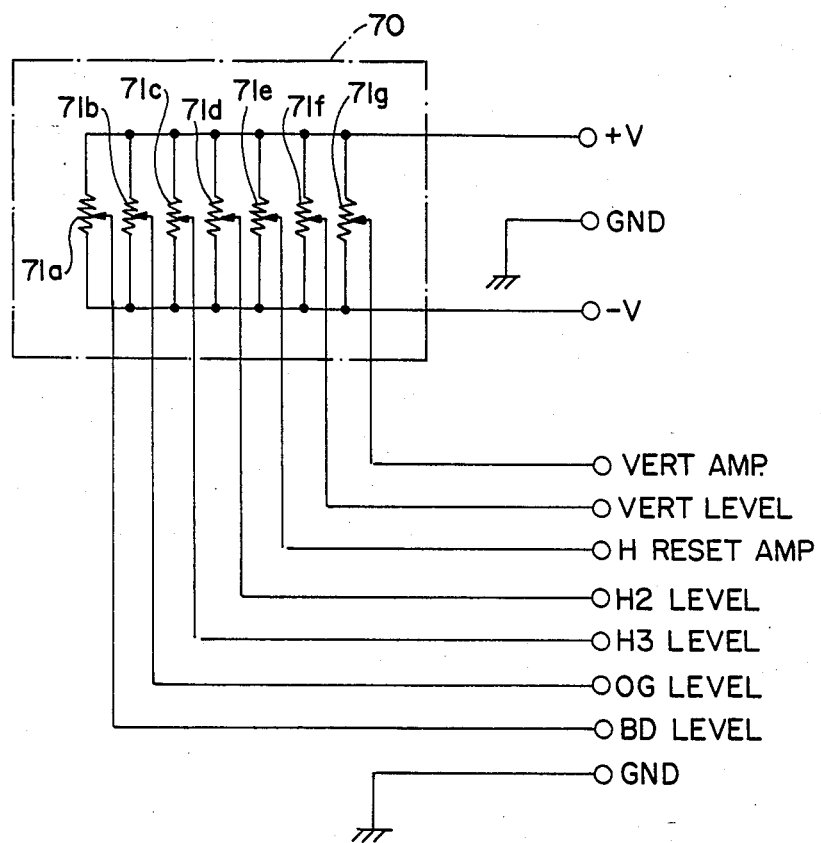
FIG. 5 is a circuit diagram showing a level adjusting means shown in FIG. 4.

With further reference to FIG. 5, shown therein in a detailed circuit diagram is the adjusting means 70 comprising seven potentiometers 71a through 71g each having a movable terminal from which a level adjusting signal is extracted. The potentiometers 71a through 71g are respectively given to deliver amplitude and level modification signals for vertical amplifier (VERT AMP), vertical scanning signal (VERT LEVEL), holizontal reset amplifier (H RESET AMP), holizontal scanning signal (H2 and H3 level), output gate signal (OG LEVEL: which is level for the gate of the last CCD image sensor of the horizontal register) and base biasing signal (BS LEVEL). Although there is not shown in FIG. 5, the adjusting means 70 has a potentiometer for modifying the level of color signal gain characteristics of the video signal processor 64. As apparent from the above description, there should be provided in the adjusting means 70 potentiometers of the number corresponding to the number of characteristics to be modified. In order to make the access to the adjusting means 70, the grip 42 is provided with a cover member 72 which is opened to expose the movable terminals of the potentiometers 71a through 71g.

The modification of the amplitude or level of the solid state imaging device output signal is carried out in an adjustment stage after the construction of the endoscope by adjusting the level to the indicated value by using a synchroscope, a specially designed measuring instrument and the like. Endoscopes thus adjusted can present an image of the same quality on the screen of a viewing equipment.

Although the above description has been made concerning to the endoscope having a CCD imaging sensor as an image pick-up device, the present invention is similarly applicable to the endoscope using a MOS image sensor. When using a MOS image sensor which is different in operation from a CCD image sensor and has a rather complicated interface, it may be enough to modify only characteristics to which image quality is attributing.

As apparent from the above description the endoscope according to the present invention has an adjusting means provided therein for modifying the level of the signals used to drive the solid state imaging device. The provision of the adjusting means in the endoscope enables endoscopes having solid state imaging devices with different characteristics to well match with a standarized control unit.

It should be apparent to those skilled in the art that the above-described embodiment represents but one of the many possible specific embodiments of the present invention. Numerous and varied other embodiments can be devised by those skilled in the art without departing from the spirit and scope the present invention.

What is claimed is:

1. An endoscope for monitoring an image from inside a cavity of a living body comprising:

operating means having a handle, a control section located on said handle, and a section insertable into a cavity of a living body which includes therein a solid state imaging device for receiving an optical image and converting it into electrical signals;

a control unit for providing driving signals for said solid state imaging device, said control unit further processing said electrical signals from said solid state imaging device to provide a video signal; and a display means for receiving said video signal to visualize thereon;

said operating means further comprising adjusting means for modifying levels of said driving signals from said control unit corresponding to the characteristics of said solid state imaging device, said adjusting means being located on the control section on said handle of said operating means.

2. An endoscope as defined in claim 2, wherein said adjusting means comprises potentiometers connected in parallel the number of which is corresponding to the number of signals to be modified in level and to which are applied a voltage of direct current.

3. An endoscope as defined in claim 1, wherein said control unit comprises a set-up driver for providing driving signals for said solid state imaging device corresponding to a modified level of signals from said adjusting means, means for processing said electrical signal from said solid state imaging device, and control means for providing various kinds of voltages and control signals to be supplied to said operating means, said adjusting means and said display means.

4. An endoscope as defined in claim 1, wherein said solid state imaging device is a CCD.

5. An endoscope as defined in claim 1, wherein said solid state imaging device is a MOS image sensor.

* * * * *